(12) United States Patent
Etou

(10) Patent No.: US 10,606,238 B2
(45) Date of Patent: Mar. 31, 2020

(54) SERVO CONTROLLER

(71) Applicant: FANUC CORPORATION, Yamanashi (JP)

(72) Inventor: Kouichi Etou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/788,995

(22) Filed: Oct. 20, 2017

(65) Prior Publication Data

US 2018/0120809 A1    May 3, 2018

(30) Foreign Application Priority Data

Oct. 27, 2016 (JP) .................................. 2016-210367

(51) Int. Cl.
*G05B 19/402* (2006.01)
*G05B 19/25* (2006.01)
*G05B 19/406* (2006.01)

(52) U.S. Cl.
CPC ......... *G05B 19/402* (2013.01); *G05B 19/251* (2013.01); *G05B 19/406* (2013.01); *G05B 2219/42244* (2013.01)

(58) Field of Classification Search
CPC ................ G05B 19/402; G05B 19/406; G05B 2219/42244
USPC ........................................................ 700/302
See application file for complete search history.

(56) References Cited

U.S. PATENT DOCUMENTS

| | | | | |
|---|---|---|---|---|
| 5,920,441 | A * | 7/1999 | Cunningham | G11B 5/5552 360/78.03 |
| 7,174,226 | B2 * | 2/2007 | Nakazato | G05B 19/19 700/159 |
| 2003/0108415 | A1 * | 6/2003 | Hosek | B25J 9/1664 414/783 |
| 2013/0123968 | A1 * | 5/2013 | Nishibashi | G05B 19/416 700/117 |
| 2013/0307459 | A1 | 11/2013 | Tian | |
| 2014/0070752 | A1 * | 3/2014 | Otsuji | G05D 3/20 318/603 |

(Continued)

FOREIGN PATENT DOCUMENTS

| JP | H07271441 A | 10/1995 |
|---|---|---|
| JP | 2012-38312 A | 2/2012 |
| JP | 2016-31557 A | 3/2016 |

OTHER PUBLICATIONS

Office Action issued in JP Application No. 2016-210367, dated Mar. 13, 2018, 9 pages.

(Continued)

*Primary Examiner* — Ziaul Karim
(74) *Attorney, Agent, or Firm* — Hauptman Ham LLP

(57) ABSTRACT

A servo controller calculates an alternative movement amount, in a control cycle (n) in which a command cannot be received from the host controller, according to jerk calculated with reference to amounts of movement used for controlling the servomotor in former control cycles before the control cycle (n) and the movement amount used for controlling the servomotor in the previous control cycle before the control cycle (n). The servo controller controls movement of the servomotor by use of the alternative movement amount in the control cycle (n) in which the command cannot be received from the host controller.

2 Claims, 5 Drawing Sheets

(56) References Cited

U.S. PATENT DOCUMENTS

2014/0172153 A1* 6/2014 Nishibashi ......... G05B 19/4103
                                                700/192
2014/0195037 A1* 7/2014 Nishibashi ......... G05B 19/4103
                                                700/188
2016/0026170 A1* 1/2016 Etou .................... G05B 19/416
                                                318/603

OTHER PUBLICATIONS

German Office Action for Application No. 10 2017 124 537.5 dated Oct. 21, 2019, 11 pp.

* cited by examiner

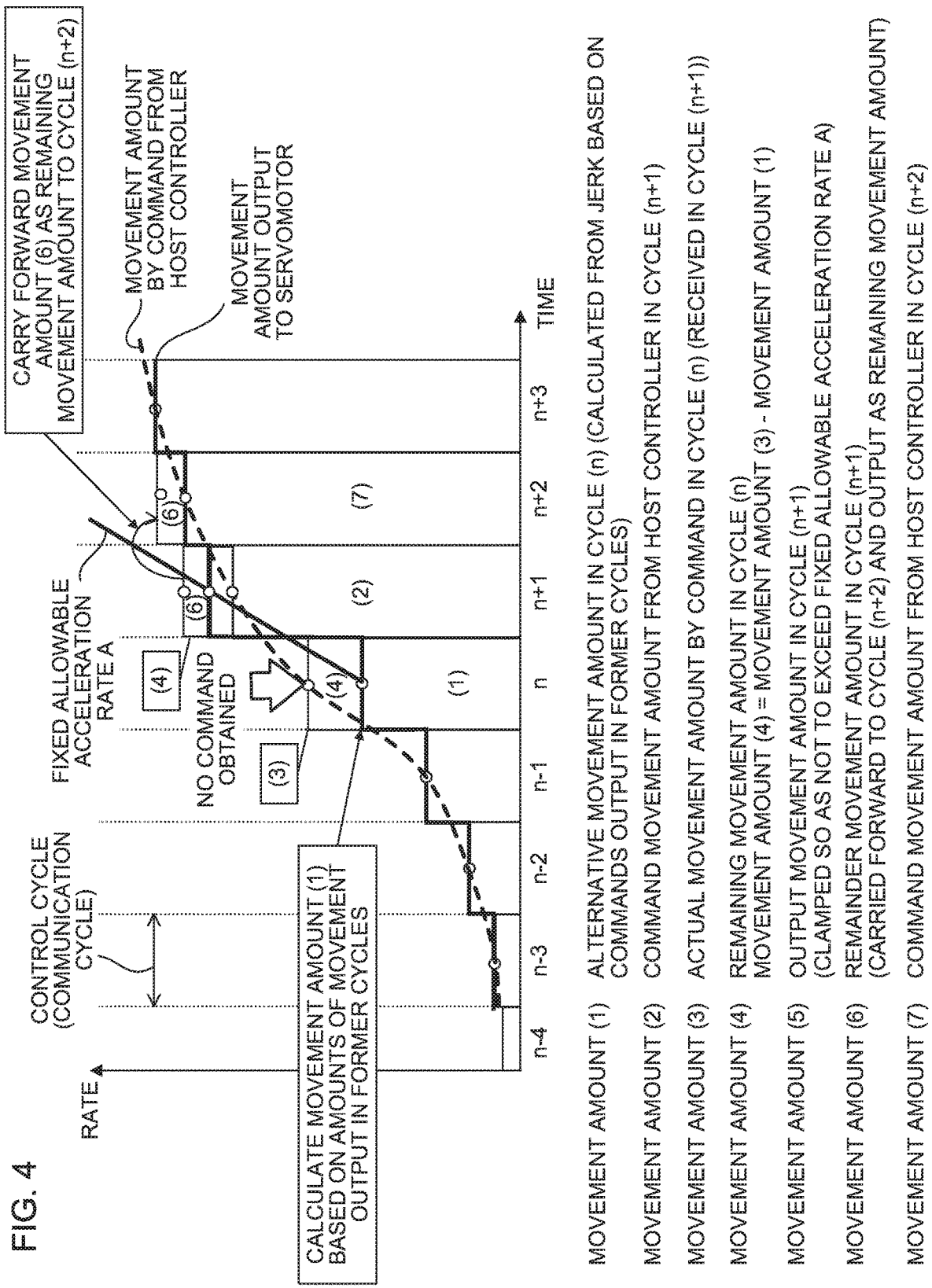

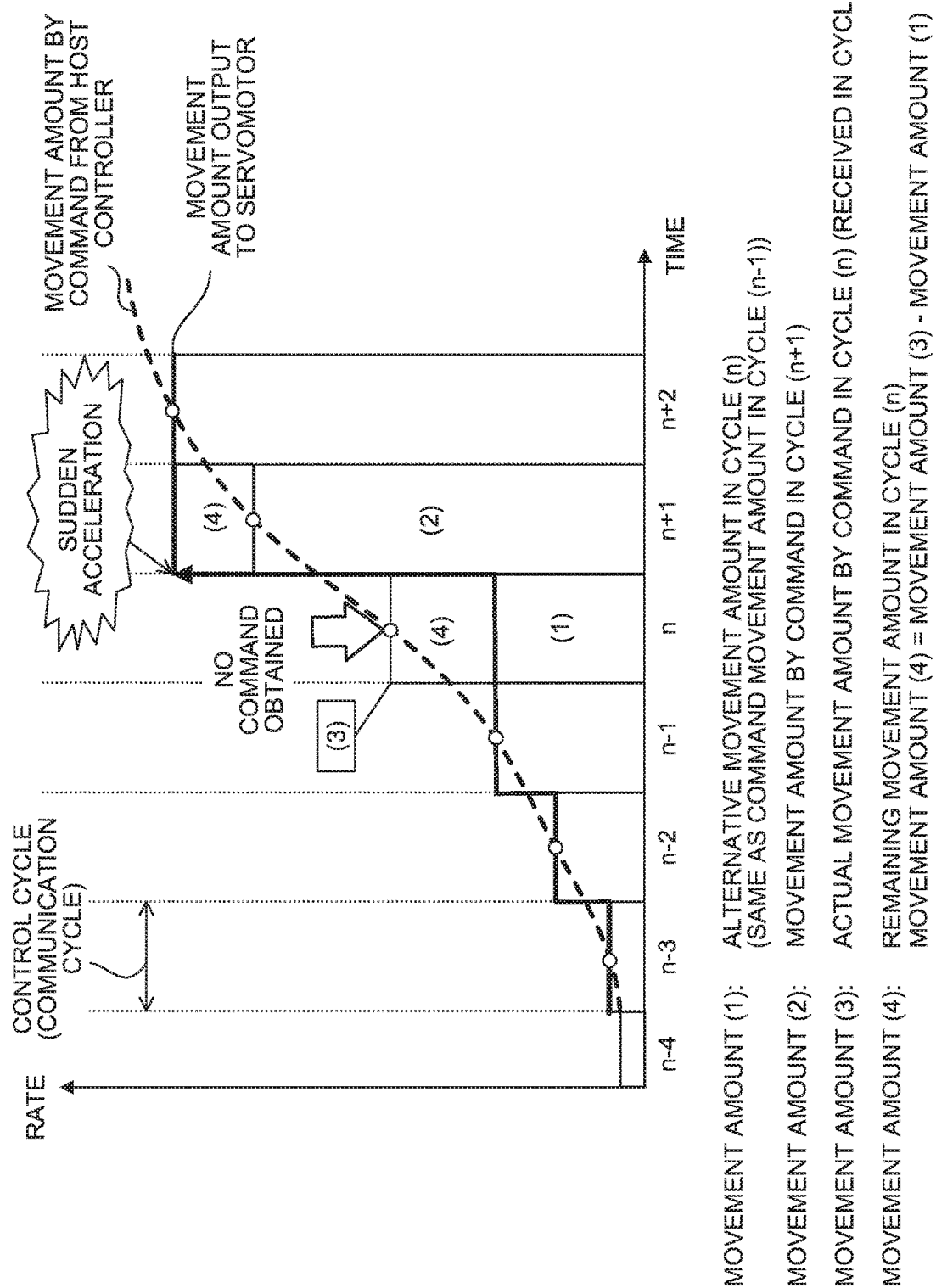

SERVO CONTROLLER

RELATED APPLICATIONS

The present application claims priority to Japanese Application Number 2016-210367 filed Oct. 27, 2016, the disclosure of which is hereby incorporated by reference herein in its entirety.

BACKGROUND OF THE INVENTION

1. Field of the Invention

The present invention relates to servo controllers, and particularly to a servo controller for recovering a command which cannot be received from a host controller.

2. Description of the Related Art

Servo controllers are connected to host controllers via serial communication over communication channels to receive commands from the host controllers per control cycle (communication cycle), and control servomotors to move in accordance with the movement amount determined by the commands received.

If a communication error occurs between a servo controller and a host controller, the servo controller cannot receive a command from the host controller during a control cycle in which the communication error occurs, which prevents the servo controller from determining the movement amount to be output to a servomotor in the control cycle based on the command. If the servo controller cannot output the movement amount to the servomotor during the control cycle due to such a communication error while the servomotor is driving at a constant rate, the servomotor may suddenly stop to damage a machine.

For dealing with such a problem, Japanese Patent Application Laid-Open No. 07-271441 discloses a motor controller which generates an alternative command movement amount on the basis of the previous command movement amount received in the previous control cycle to output the generated command movement amount to the motor when a communication error occurs between the motor controller and a host controller, and requests the host controller to resents the command not received. The motor controller receives the previous command resent in the following control cycle where the communication error occurs, and corrects the movement amount so as to cancel the difference between the received command and the alternative command at the time when the command has not received yet, thereby converging the error.

FIG. 5 is a diagram (a graph) illustrating the processing which is performed when a communication error occurs in the motor controller disclosed in Japanese Patent Application Laid-Open No. 07-271441 mentioned above. The horizontal axis represents time and the vertical axis represents movement amount output to the motor per control cycle (that is, speed if the control cycle is regarded as a unit time). FIG. 5 shows the case in which the communication error occurs in the control cycle (n).

When the motor controller disclosed in Japanese Patent Application Laid-Open No. 07-271441 cannot receive a command (the movement amount (3)) which is to be received from the host controller in a control cycle (n) due to occurrence of communication error in the control cycle (n), the motor controller outputs, to the motor, the same movement amount as the movement amount by a command received in the previous control cycle (control cycle (n−1)), as an alternative movement amount (as the movement amount (1)), in the control cycle (n) thus outputting an alternative command. Then the motor controller acquires, in the following control cycle (n+1), the movement amount (2) by a command received from the host controller in the control cycle (n+1) and the movement amount (3) by an actual command that could be received in the control cycle (n), and calculates a remaining movement amount (the movement amount (4)) which is a difference between the actual movement amount (3) by the actual command in the control cycle (n) and the alternative movement amount (the movement amount (1)), and then output, to the motor, the sum of the remaining movement amount (4) thus calculated and the movement amount (2) by the command in the current cycle (control cycle (n+1), thereby cancelling the remaining movement amount.

In the motor controller as disclosed in Japanese Patent Application Laid-Open No. 07-271441, since all of the remaining movement amount (4) that could be output in the control cycle (n) is cancelled in the next control cycle (n+1), the motor suddenly accelerates or decelerates in the control cycle (n+1) when the remaining movement amount is large, for example, when the motor is accelerating or decelerating during the period from the control cycle (n−1) to the control cycle (n). Such sudden acceleration or deceleration may cause damage to a machine.

SUMMARY OF THE INVENTION

It is therefore an object of the present invention to provide a servo controller capable of preventing sudden acceleration or deceleration of a servomotor as a control object even if the servo controller fails to receive a command from a host controller.

A servo controller according to the present invention solves the aforementioned problems by calculating an alternative movement amount to be output to a servomotor in a control cycle in which a command issued from a host controller could be received, based on a jerk which is calculated from the movement amounts output to the servomotor in a past predetermined number of control cycles.

When cancelling a remaining movement amount in the control cycle subsequent to the control cycle in which the command from a host controller could be received, the servo controller according to the present invention also calculates a command movement amount upper limit based on a designated acceleration determined in advance by parameters or the like and the alternative movement amount, and outputs the movement amount which is clamped by the calculated command movement amount upper limit to the servomotor, and cancels the movement amount that has not been output owing to the clamping, as a remainder movement amount, in a control cycle after the control cycle in which the command from the host controller could be received.

A servo controller for controlling a servomotor in accordance with an movement amount determined by a command received from a host controller in a predetermined control cycle according to the present invention includes: an alternative command calculation unit configured to, in a control cycle (n) in which a command cannot be received from the host controller, calculate an alternative movement amount according to jerk calculated with reference to amounts of movement used for controlling the servomotor in former control cycles before the control cycle (n) and an movement amount used for controlling the servomotor in a previous control cycle immediately before the control cycle (n); and a command movement amount adjusting unit configured to control movement of the servomotor by use of the alternative movement amount in the control cycle (n) in which the command cannot be received from the host controller.

The command movement amount adjusting unit may calculate a difference between an movement amount determined by a command of the control cycle (n) received from the host controller in a following control cycle (n+1) and the alternative movement amount used for controlling the movement of the servomotor in the control cycle (n), and adjust an movement amount used for controlling the servomotor in such a manner as to offset the difference after the control cycle (n+1).

The servo controller may further include: a command upper-limit calculation unit configured to calculate a command movement amount upper limit of an movement amount of the servomotor in each control cycle in accordance with a predetermined rate of acceleration and an movement amount used for controlling the servomotor in a previous control cycle; and a remaining movement amount calculation unit configured to calculate a remaining movement amount based on a remainder movement amount output from the command movement amount adjusting unit in each control cycle and output the calculated remaining movement amount in a following control cycle. The command movement amount adjusting unit may limit, to the command movement amount upper limit, an movement amount obtained by adding the remaining movement amount to an movement amount determined by a command received from the host controller in each control cycle so as to use the limited amount for controlling the servomotor, and output a rest of the movement amount limited to the command movement amount upper limit as a remainder movement amount to the remaining movement amount calculation unit.

According to the present invention, when a command from the host controller cannot be received due to a communication error, the servo controller controls the servomotor by calculating an accurate alternative movement amount, thereby enabling to prevent sudden acceleration or deceleration of the servomotor. Further, since the servo controller cancels the remaining movement amount in each control cycle within a range not exceeding the designated acceleration, the servo controller can prevent sudden acceleration or deceleration of the servomotor.

BRIEF DESCRIPTION OF THE DRAWINGS

FIG. 4 is a diagram illustrating movement control processing by the servo controller according to the embodiment of the present invention.

FIG. 5 is a diagram illustrating a problem with a conventional motor controller.

DETAILED DESCRIPTION OF THE PREFERRED EMBODIMENTS

Figure 1:
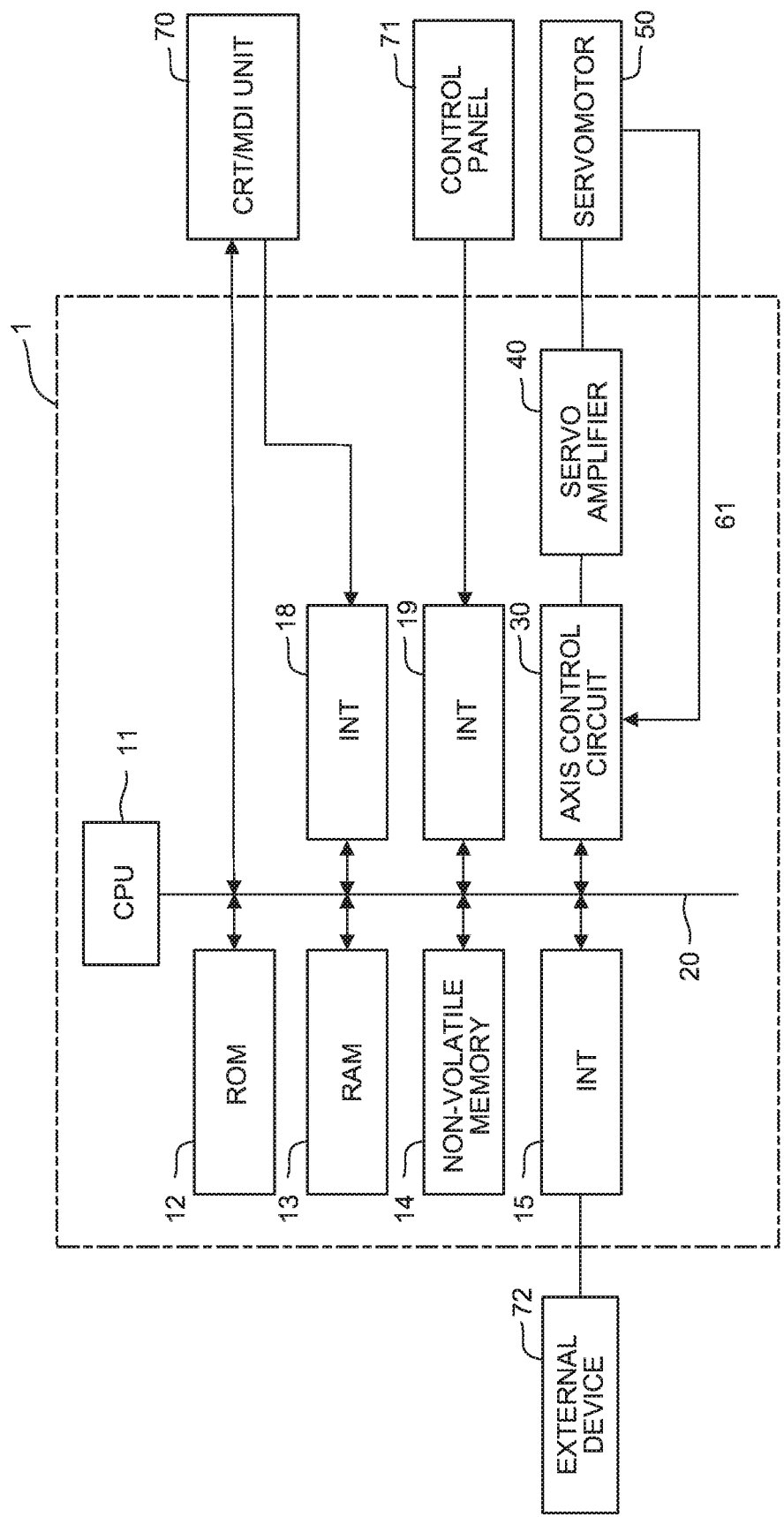
FIG. 1 is a diagram showing a hardware configuration of a main part of a servo controller according to an embodiment of the present invention.

FIG. 1 is a diagram showing a hardware configuration of a main part of a servo controller according to an embodiment of the present invention.

The servo motor 1 includes a CPU 11 which is a processor configured to entirely control the servo controller 1. The CPU 11 reads out data stored in ROM 12 via a bus 20, so as to control the entire servo controller 1 in accordance With the data. RAM 13 stores temporary calculation data and display data, and various kinds of data input by an operator via a CRT/MDI unit 70.

Non-volatile memory 14 is configured to retrieve stored information even after the power of the servo controller 1 is turned off due to a backup battery (not shown), for example. The non-volatile memory 14 stores various kinds of data such as parameters read via an interface 15 and data input via the CRT/MDI unit 70 described below.

The interface 15 connects the servo controller 1 and an external device 72. The external device 72 serves as a host controller with respect to the servo controller 1. Various kinds of commands, input signals, and parameters are read from the host controller 72. In addition, feedback data in the servo controller 1 and various kinds of data such as output signals can be output to the host controller 72.

The CRT/MDI unit 70 is a manual data input device including a display and a keyboard. An interface 18 receives a command or data through the keyboard of the CRT/MDI unit 70 to transfer the command or data to the CPU 11. An interface 19 is connected to a control panel 71 including a manual pulse generator.

An axis control circuit 30 for controlling axes included in a machine tool receives a command movement amount of each axis from the CPU 11, and outputs the command movement amount to a servo amplifier 40. The servo amplifier 40 receives the command movement amount to drive a servomotor 50 for moving each axis included in the machine tool. The servomotor 50 for moving each axis is equipped with a pulse coder (not shown), and configured to implement position feedback control by forwarding a position feedback signal from the pulse coder to the axis control circuit 30. Although the hardware configuration diagram of FIG. 1 only indicates the single axis control circuit 30, servo amplifier 40, and servomotor 50 for brevity, the number of each of the axis control circuit 30, the servo amplifier 40, and the servomotor 50 corresponds to the number of axes included in the machine tool.

Figure 2:
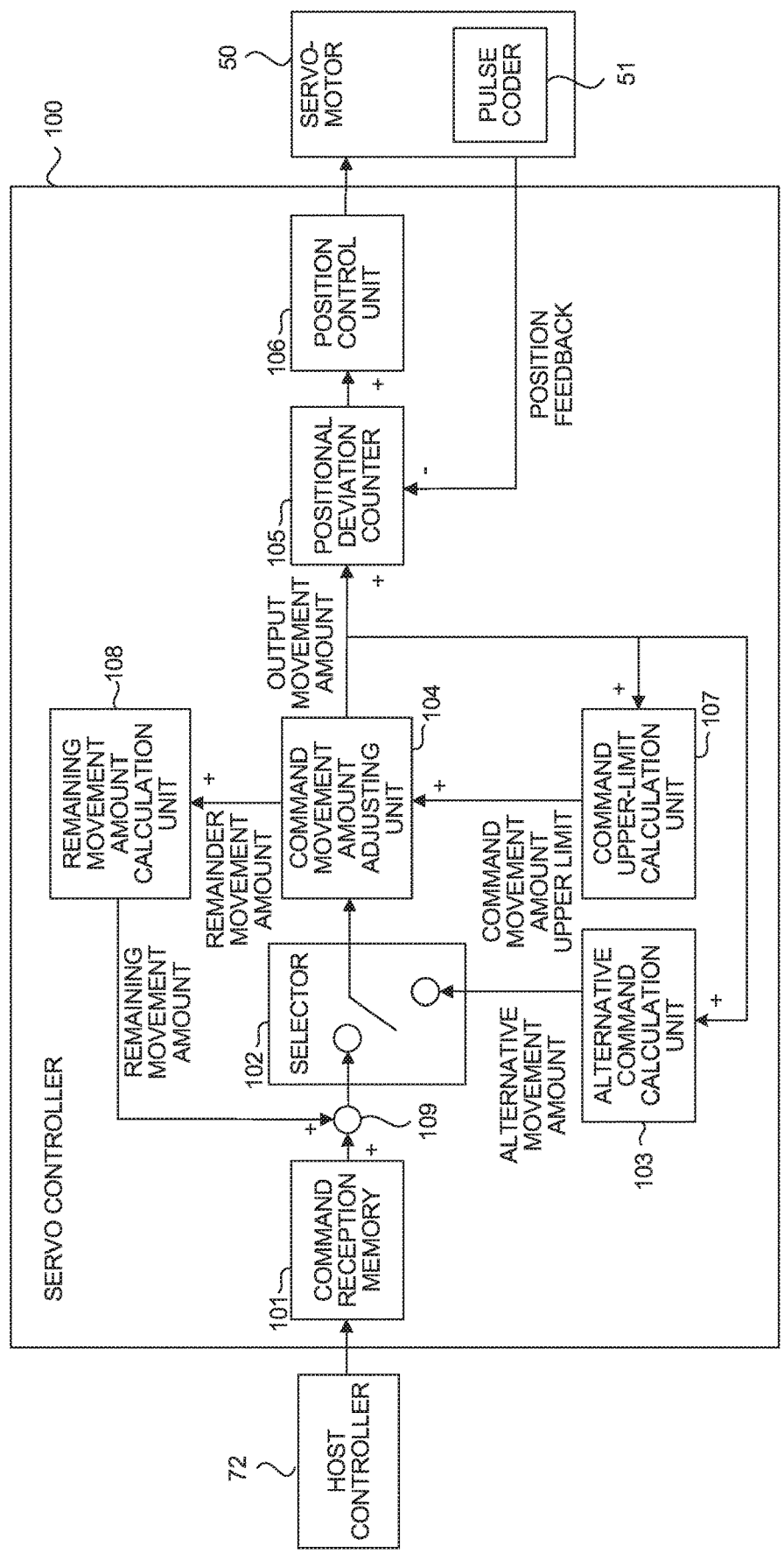
FIG. 2 is a schematic functional block diagram of the servo controller according to the embodiment of the present invention.

FIG. 2 is a schematic functional block diagram of the servo controller according to the present embodiment.

The servo controller 100 according to the present embodiment includes command reception memory 101 configured to store commands received from the host controller 72, a selector 102 configured to selectively switch inputting of a movement amount in a normal state and inputting of a movement amount in a state where a communication error occurs, an alternative command calculation unit 103 configured to calculate an alternative command movement amount in s state where a communication error occurs, a command movement amount adjusting unit 104 configured to adjust the movement amount so as not to cause sudden acceleration or deceleration, a positional deviation counter 105 used for position feedback control, a position control unit 106 configured to control a position of the servomotor 50, a command upper-limit calculation unit 107 configured to calculate an upper limit of the movement amount in each control cycle, and a remaining movement amount calculation unit 108 configured to calculate a remaining movement amount that could not be output in a control cycle.

The servo controller 100 receives a command from the host controller 72 and stores the received command in the command reception memory 101. The selector 102 allows the command movement amount adjusting unit 104 to read out the movement amount by the command, stored in the command reception memory 101, in the normal state (in the state where the command is stored in the command reception memory 101), so that the command movement amount adjusting unit 104 outputs, to the positional deviation counter 105, the movement amount determined by the command read from the command reception memory 101 as an output movement amount. The positional deviation counter 105 calculates a positional deviation based on the output movement amount received from the command movement amount adjusting unit 104 and the position feedback from the pulse coder 51 of the servomotor 50. The position control unit 106 controls the movement of the servomotor 50 based on the calculated positional deviation.

When a communication error occurs between the servo controller 100 and the host controller 72, a command from the host controller 72 is not stored in the command reception memory 101 in the control cycle (communication cycle) in which the communication error has occurred. The selector 102 then switches the connection so as to allow the command movement amount adjusting unit 104 to read out the alternative movement amount calculated by the alternative command calculation unit 103. The host controller 72 is requested to resend the command that has not been received because of the communication error. The request for resending is preferably made as soon as possible after the communication error is detected, since the request for resending should be completed before the host controller 72 starts sending a next command.

Alternatively, a ring buffer for keeping data remaining as long as the data is not overwritten upon transmission and reception of a command may be used. During the transmission and reception of a command by use of the ring buffer, a write pointer in the host controller 72 and a read pointer in the command reception memory 101 are updated every control cycle, so that the command reception memory 101 can simultaneously acquire, even in a control cycle after a control cycle where reception could not be made due to a communication error, a command that has not been received and a command in the control cycle. When the read pointer is not updated, the host controller 72 can recognize the fact that the command reception memory 101 could not receive a command in the previous control cycle.

The alternative command calculation unit 103 calculates an alternative movement amount based on a jerk calculated from output command movement amounts output from the command movement amount adjusting unit 104 in a predetermined number of past control cycles and the output command movement amount output in the previous control cycle. The alternative command calculation unit 103 may calculate the jerk from the output command movement amounts output in the past three or more control cycles, or further may calculate the jerk taking into consideration the output command movement amount output in control cycles before the abovementioned past three or more control cycles.

In the next control cycle after a control cycle where the communication error occurs, the servo controller 100 receives from the host controller 72 the command in the current control cycle and the command in the previous control cycle. The command movement amount adjusting unit 104 then calculates a difference between the movement amount by the command in the previous control cycle and the output movement amount (the alternative command movement amount) output in the previous control cycle, and adds the difference to the movement amount by the command in the current control cycle to obtain a temporary output command movement amount. The command movement amount adjusting unit 104 compares the obtained temporary output command movement amount with a command movement amount upper limit calculated by the command upper-limit calculation unit 107. When the temporary output command movement amount exceeds the command movement amount upper limit, the command movement amount adjusting unit 104 clamps the temporary output command movement amount with the command movement amount upper limit, and outputs the clamped value, as the output command movement amount to the positional deviation counter 105. The command movement amount adjusting unit 104 outputs, on the other hand, the movement amount that has not been output by the clamping to the remaining movement amount calculation unit 108, as a "remainder movement amount".

The command upper-limit calculation unit 107 calculates the command movement amount upper limit from the output movement amount output in the previous control cycle from the command movement amount adjusting unit 104 and a designated acceleration set in advance using parameters and outputs the calculation result to the command movement amount adjusting unit 104. The command movement amount upper limit may be calculated according to the following equation (1):

$$\text{Command movement amount upper limit} = \text{output movement amount in previous control cycle} + \text{a designated acceleration} \times \text{control cycle} \quad (1)$$

The remaining movement amount calculation unit 108 accumulates the remainder movement amounts received from the command movement amount adjusting unit 104 to calculate the remaining movement amount, and inputs the calculation result to an adder/subtracter 109 so that the calculation result is added to the next movement amount.

Figure 3:
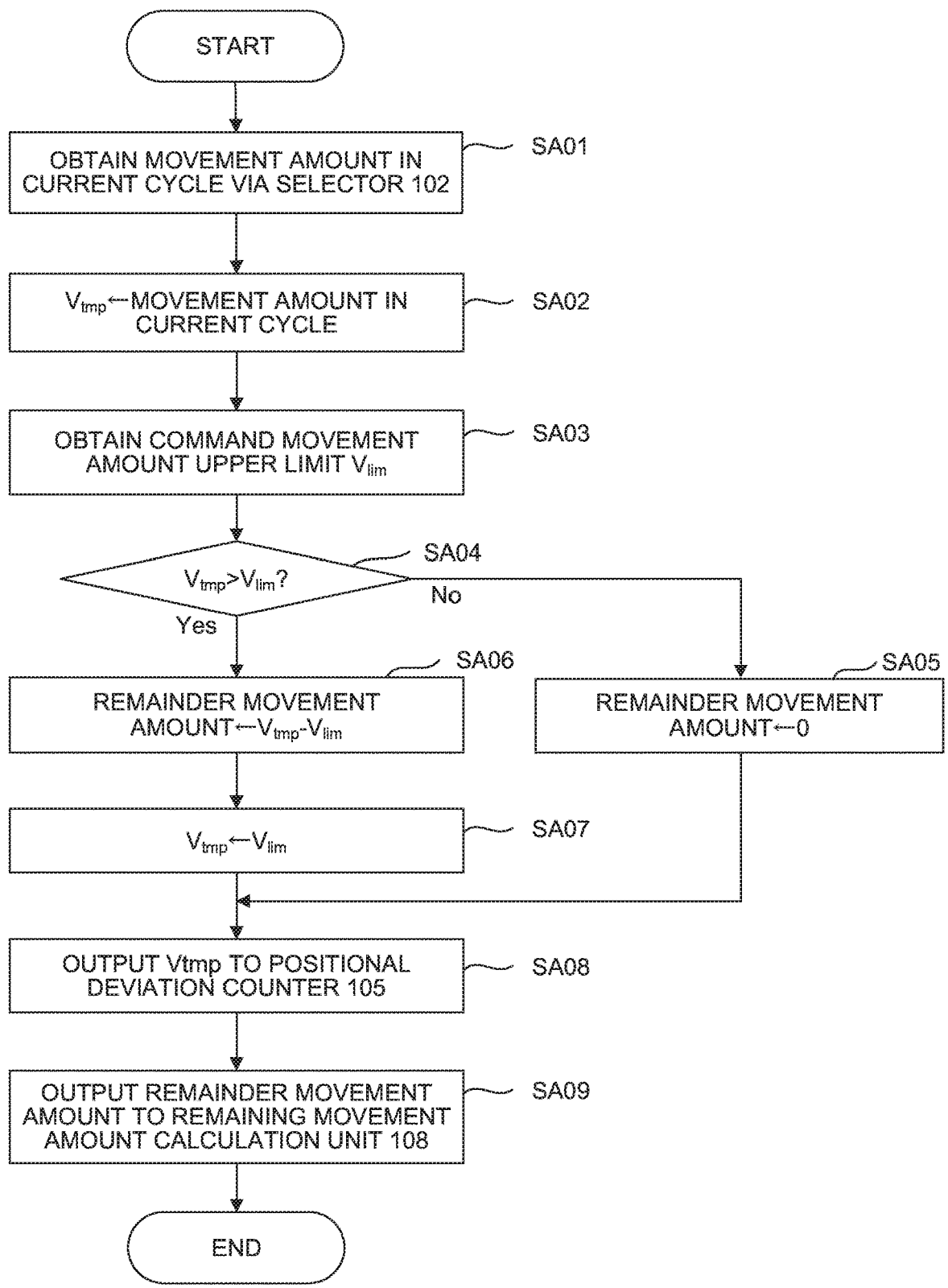
FIG. 3 is a flowchart illustrating an operation of a command movement amount adjusting unit according to the embodiment of the present invention.

FIG. 3 is a flowchart illustrating the operation by the command movement amount adjusting unit 104 included in the servo controller 100 shown in the functional block diagram of FIG. 2. The operation is described in detail below according to the following steps.

[Step SA01] The command movement amount adjusting unit 104 acquires the movement amount in the current control cycle from the command reception memory 101 via the selector 102. In the case in which a command can be received from the host controller 72, the movement amount acquired by the command movement amount adjusting unit 104 is the sum of the movement amount determined by the command and the remaining movement amount output from the remaining movement amount calculation unit 108. In the case in which a command cannot be received from the host controller 72, the movement amount acquired by the command movement amount adjusting unit 104 is the alternative movement amount output from the alternative command calculation unit 103.

[Step SA02] The command movement amount adjusting unit 104 sets a temporary output movement amount Vtmp at the movement amount acquired in step SA01.

[Step SA03] The command movement amount adjusting unit 104 acquires a command movement amount upper limit Vlim output from the command upper-limit calculation unit 107.

[Step SA04] The command movement amount adjusting unit 104 determines whether the temporary output movement amount Vtmp is larger than the command movement amount upper limit Vlim. The step proceeds to step SA06 when the temporary output movement amount Vtmp is larger than the command movement amount upper limit Vlim. The process proceeds to step SA05 when the temporary output movement amount Vtmp is the command movement amount upper limit Vlim or smaller.

[Step SA05] The command movement amount adjusting unit 104 fixes the remainder movement amount to zero.

[Step SA06] The command movement amount adjusting unit 104 sets the remainder movement amount at a value obtained by the following subtraction: the temporary output movement amount Vtmp—the command movement amount upper limit Vlim.

[Step SA07] The command movement amount adjusting unit 104 limits the temporary output movement amount Vtmp to the command movement amount upper limit Vlim (sets the temporary output movement amount Vtmp at the command movement amount upper limit Vlim).

[Step SA08] The command movement amount adjusting unit 104 outputs the limited temporary output movement amount Vtmp as an output movement amount to the positional deviation counter 105.

[Step SA09] The command movement amount adjusting unit 104 outputs the remaining movement amount to the remainder movement amount calculation unit 108.

FIG. 4 is a diagram (a graph) illustrating the movement control processing by the servo controller 100 according to the present embodiment described above in the case in which a communication error occurs. As in the case of FIG. 5 regarding the conventional motor controller, the horizontal axis represents time, and the vertical axis represents rate denoting the movement amount output to the servomotor per control cycle (regarded as unit time). FIG. 4 shows the case in which the communication error occurs in the control cycle (n).

As shown in FIG. 4, when the servo controller 100 of this embodiment cannot receive a command from the host controller 72 in the control cycle (n), the alternative movement amount (the movement amount (1)) is calculated on the basis of the jerk calculated according to the amounts of movement output in the former control cycles and the output movement amount output in the previous control cycle and the calculated movement amount is output to the movement amount adjusting unit 104. This control processing by the servo controller 100 according to the present embodiment can increase the precision of the alternative movement amount with respect to the actual movement amount determined by the command, as compared with the case in which the communication error occurs in the conventional control processing shown in FIG. 5. Accordingly, the probability of sudden acceleration or deceleration can be reduced upon the processing of offsetting the remaining movement amount in later control cycles.

In the following control cycle (n+1) after the control cycle (n) in which the communication error occurs, the servo controller 100 according to the present embodiment regulates the remaining movement amount not output in the control cycle (n) (the movement amount (4) obtained by subtracting the alternative movement amount from the actual movement amount in the control cycle (n)) in a manner such that not all the remaining movement amount (4) is offset, depending on the conditions. In other words, the servo controller 100 of this embodiment limits the output movement amount to the command movement amount upper limit Vlim so as not to exceed the rate of acceleration A predetermined by parameters in the control cycle (n+1), and carries forward the remainder movement amount (the movement amount (6)) to the following control cycle (n+2).

The servo controller 100 of this embodiment then determines in the control cycle (n+2) whether the sum of the movement amount (7) determined by the command from the host controller 72 and the remaining movement amount (the movement amount (6)) in the control cycle (n+1) exceeds the fixed rate of acceleration A before outputting. This control processing by the servo controller 100 according to the present embodiment can prevent sudden acceleration or deceleration upon the processing of offsetting the remaining movement amount, as compared with the case in which the communication error occurs in the conventional control processing shown in FIG. 5, since the servomotor accelerates or decelerates within the fixed rate of acceleration A.

While the embodiment of the present invention has been described above, the present invention is not intended to be limited to the descriptions of the embodiment, and various modifications may be made as appropriate to cover equivalents and alternatives falling within the scope of the present invention.

For example, the servo controller according to the present invention may be applicable to various kinds of control processing of machines equipped with numerical control machines, robots, and other motors.

What is claimed is:

1. A servo controller for controlling a servomotor in accordance with a movement amount determined by a command received from a host controller in a predetermined control cycle, the servo controller comprising:
   a processor programmed to
      in a control cycle (n) in which a command cannot be received from the host controller, calculate an alternative movement amount according to
         jerk calculated with reference to amounts of movement used for controlling the servomotor in former control cycles before the control cycle (n), and
         a movement amount used for controlling the servomotor in a previous control cycle (n−1) before the control cycle (n), and
      control movement of the servomotor by use of the alternative movement amount in the control cycle (n) in which the command cannot be received from the host controller,
   wherein the processor is further programmed to
      calculate a command movement amount upper limit of a movement amount of the servomotor in each control cycle in accordance with a predetermined rate of acceleration and a movement amount used for controlling the servomotor in a previous control cycle,
      calculate a remaining movement amount based on a remainder movement amount adjusted by the processor in said each control cycle,
      output the calculated remaining movement amount in a following control cycle,
      limit, to the command movement amount upper limit, a movement amount obtained by adding the remaining movement amount to a movement amount determined by a command received from the host controller said in each control cycle so as to use the limited amount for controlling the servomotor in said each control cycle, and
      output a rest of the movement amount limited to the command movement amount upper limit as a remainder movement amount adjusted by the processor.

2. The servo controller according to claim 1, wherein the processor is further programmed to
   calculate a difference between a movement amount determined by a command of the control cycle (n) received from the host controller in a following control cycle (n+1), and the alternative movement amount used for controlling the movement of the servomotor in the control cycle (n), and adjust a movement amount used for controlling the servomotor in such a manner as to offset the difference after the following control cycle (n+1).

\* \* \* \* \*